United States Patent [19]

Chiang et al.

[11] Patent Number: 5,317,054
[45] Date of Patent: May 31, 1994

[54] REINFORCED POLYAMIDE COMPOSITES

[75] Inventors: Chih-Cheng Chiang; Mao-Song Lee; Jen-Lien Lin; Der-Tarng Su; Shen-Nan Tong, all of Taiwan, Taiwan

[73] Assignee: Industrial Technology Research Institute, Taiwan, Taiwan

[21] Appl. No.: 925,896

[22] Filed: Aug. 7, 1992

Related U.S. Application Data

[63] Continuation of Ser. No. 515,718, Apr. 27, 1990, abandoned.

[51] Int. Cl.$^5$ .............................. C08K 3/34; C08K 3/40
[52] U.S. Cl. ........................ 524/451; 524/94; 524/112; 524/287; 524/322; 524/494
[58] Field of Search ............... 524/94, 112, 287, 322, 524/451, 494

[56] References Cited

U.S. PATENT DOCUMENTS

| | | | |
|---|---|---|---|
| 4,105,709 | 8/1978 | Iwami et al. | 524/451 |
| 4,125,514 | 11/1978 | Stabler | 524/451 |
| 4,452,931 | 6/1984 | Okamoto et al. | 524/112 |
| 4,501,844 | 2/1985 | Chen et al. | 524/451 |

FOREIGN PATENT DOCUMENTS

| | | | |
|---|---|---|---|
| 0357065 | 3/1990 | European Pat. Off. | 524/112 |
| 41-008869 | 5/1966 | Japan | 524/112 |
| 53-14755 | 2/1978 | Japan | 524/112 |
| 62-218445 | 9/1987 | Japan | 524/451 |
| 64-24852 | 1/1989 | Japan | 524/112 |
| 8600631 | 1/1986 | World Int. Prop. O. | 524/322 |

OTHER PUBLICATIONS

Polymer Blends, 38–66 (ACS 1989).

*Primary Examiner*—Paul R. Michl
*Assistant Examiner*—John J. Guarriello
*Attorney, Agent, or Firm*—Cushman, Darby & Cushman

[57] ABSTRACT

A reinforced polyamide composites comprising polyamide resin, 1 to 60 weight percent fiber and/or talc, and 0.1 to 5 phr (part per hundred by resin) interfacial modifier, based on the weight of the polyamide composites; wherein the interfacial modifier are functional organic compounds of structural formula:

$$R_1(CO_2H)x;$$

$$R_1(CO)_2NH; \text{ and}$$

$$R_1(CO)_2O,$$

where
$R_1$, $R_2$, $R_3$ may be aliphatic or aromatic hydrocarbyl group; the number of carbon atoms in $R_1$, $R_2$ and $R_3$ is in the range of 2 to 16, preferably 2 to 12; and $x=1$ to 4.

The interfacial modifier can be mixed with glass and/or talc and polyamide simultaneously and compounded directly; or, premix the interfacial modifier and polyamide, melt the premix, then incorporate glass fiber and/or talc and compound to form the reinforced polyamide composites. The physical properties of the instant composites can be improved significantly.

8 Claims, No Drawings

REINFORCED POLYAMIDE COMPOSITES

This is a continuation of application Ser. No. 07/515,718, filed on Apr. 27, 1990, now abandoned.

FIELD OF THE INVENTION

Reinforced polyamide resin has a large market share of reinforced engineering thermoplastics. To obtain good physical properties is the goal of research regarding the fiber and/or filler reinforced plastics. The first consideration for optimizing physical properties of fiber reinforced plastics is the stable adhesive strength between fiber and resin; on the other hand, the resin matrix must be able to prevent breaking of fiber caused by stress attacking. Accordingly, in order to prevent loss of physical properties of the composites and improve the adhesive strength between fiber and resin, a usual method comprises treating fiber with primer and coupling agent during preparation of fiber as described, for example, in U.S. Pat. Nos. 4,231,910, 3,981,851 and 3,644,245. The literature, for example, 40th Annual Conference, Reinforced Plastics/Composite Institute, SPI, Inc. 1985, section 21-A, describes an evaluation test of the effect of different treating methods of fiber on the physical properties of fiber reinforced polyamide under with the object of improving the physical properties of the fiber reinforced polyamide composites. Improving adhesive strength between fiber and polyamide resin through treatment of fiber is the most efficient way for the fiber manufacturer to improve these physical properties. Notwithstanding, this way is not the only such method for the compounder of engineering plastics.

DETAILED DESCRIPTION OF THE INVENTION

The instant invention provides a method comprising addition of interfacial modifier during compounding, which leads to enhanced adhesive strength between fiber and/or filler and polyamide resin and thereby raises the physical properties of reinforced polyamide engineering plastics.

The instant invention relates to a reinforced polyamide composites comprising polyamide resin, 1 to 60 weight percent fiber or talc, and 0.1 to 5 phr interfacial modifier, preferably 0.3 to 1 phr, based on the weight of the polyamide composites.

The polyamide resin of the reinforced polyamide composites of the instant invention comprises polymer of general formula

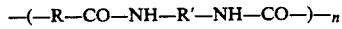

where
R and R' may be identical or different alkylene groups; in particular, polyamide-6 prepared through condensation polymerization of hexamethylene diamine and adipic acid.

The fiber used in the reinforced polyamide composites of the instant invention comprise any type of commercial glass fiber suitable for polyamide; the amount of the fiber in the composites may be 1 to 60, preferably, 10 to 50 weight percent based on the weight of the composites.

The material used for reinforcing the polyamide may comprise filler, such as talc, silica, barium sulfate and other filler; in particular, talc; the amount of reinforcing filler in the compositions of the instant invention may be in the range of 1 to 60, preferably, 5 to 40 weight percent based on the weight of the composites.

The reinforced polyamide composites of the instant invention comprise also the polyamide composites reinforced with fiber and filler simultaneously; the amount of fiber and filler together in the composites may be in the range of 1 to 60 weight percent based on the weight of the composites.

The interfacial modifiers used for improving the reinforced polyamide composites comprise compounds of structural formulae

where
$R_1$, $R_2$, $R_3$ may be aliphatic or aromatic hydrocarbyl group; the number of carbons in $R_1$, $R_2$ and $R_3$ is in the range of 2 to 16, preferably 2 to 12; and $x = 1, 2, 3$ or 4. When x is 2, R, may be an aliphatic and/or aromatic $C_2$ to $C_{12}$ group. More particularly, $R_2$ may be a $C_2$–$C_8$ aliphatic and/or aromatic group, and $R_3$ may be a $C_2$–$C_6$ aliphatic and/or aromatic group.

The invention further relates to a process for preparing reinforced polyamide composites by dry mixing fiber and/or talc, polyamide resin, interfacial modifier and/or additives, and feeding together and compounding in an extruder to obtain the composites. This process may also be carried out by premixing polyamide with interfacial modifer, feeding the premix by first feeding into the extruder after melting the polyamide and then feeding fiber and/or talc and/or other additives into the extruder and compounding to obtain the composites.

The reinforced polyamide composites of the instant invention will be illustrated with the following examples, which show the improving effect of the interfacial modifier of the instant invention on the physical properties of the reinforced polyamide composites; nevertheless, the instant invention are not limited by these examples.

EXAMPLES

Comparative Examples 1 to 3 and Examples 1 to 3

Table 1 lists formulations of composites in comparative examples 1 to 3 which do not contain interfacial modifier and corresponding examples 1 to 3 which, on the other hand, contain interfacial modifier as indicated in the Table; among which, comparative example 1, 2 and 3 are to be compared with examples 1, 2 and 3, respectively. In the process used in examples 1 to 3, the interfacial modifier were premixed with polyamide, and dry blended with glass fiber, feeded and compounded in an extruder at temperature of 220° to 330° C.; then, dried and injection molded into test specimens which were tested for physical properties in accordance with ASTM test standard. The results are listed in Table 1 also, which show the enhancement of the flexural strength obtained in examples 1, 2 and 3 over those obtained in comparative examples 1, 2 and 3, respectively.

Comparative Examples 4 to 6 and Examples 4 to 6

Table 2 lists formulations of composites of comparative examples 4 to 6 which do not contain interfacial modifier and Examples 4 to 6 which contain interfacial modifier as indicated in the Table.

The process used herein is the same as described in examples 1 to 3, except that polyamide-6 was replaced by polyamide-6,6; among which, comparative examples 4, 5, and 6 are to be compared with examples 4, 5, and 6, respectively. The results obtained were listed in Table 2 also; again, which show the enhancement of the flexural strength obtained in examples 4, 5, and 6 over those obtained in comparative examples 4, 5, and 6, respectively, for different glass fiber produced by several makers.

Comparative Example 7 and Examples 7 to 9

Table 3 lists formulations of composites of comparative example 7 and examples 7 to 9, wherein the effects of various interfacial modifier were evaluated. The process used herein comprises mixing interfacial modifier with polyamide, dry blending with glass fiber, compounding in an extruder at temperature 220°–300° C. and after properly dried, injection molded into test specimen which were tested for flexural strength in accordance with Standard Methods of ASTM. The results listed in Table 3 reveal obviously the enhancing effect of the interfacial modifier of the instant invention on the physical properties of the reinforced polyamide composites.

Comparative Examples 8 to 9 and Examples 10 to 12

Table 4 lists formulations of composites of comparative examples 8 to 9 and examples 10 to 12, wherein effect were evaluated for process comprising separate feeding stages of resin containing various types of interfacial modifier and glass fiber. That means processes used in examples 10 to 12 comprise mixing interfacial modifier with polyamide, feeding into one feeding entry of extruder to melt the polyamide, then, feed glass fiber via another feeding entry to compound the molten polyamide into compositens. Among which, example 10 is to be compared with comparative example 8, while examples 11 and 12 are to be compared with comparative example 9. The results shown in Table 4 were obtained in a same manner as described above.

Comparative Examples 10 to 11 and Examples 13 to 14

Table 5 lists formulations of composites of comparative examples 10 to 11 and examples 13 to 14, wherein, effects of interfacial modifier for different types and amounts of glass fiber were evaluated. Among which, Examples 13, and 14 are to be compared with comparative examples 10, and 11, respectively. Process in Examples 13 and 14 comprise mixing interfacial modifier with polyamide, dry blending the resulting mixture with glass fiber and compounding in an extruder. The strengths were tested as described above and the results were listed in Table 5 also.

Comparative Examples 12 to 13 and Examples 15 to 16

Table 6 lists the formulations of composites of comparative examples 12 to 13 and examples 15 to 16, wherein, effects of interfacial modifier for glass fiber of different specification were evaluated. Among which, examples 15 and 16 are to be compared with comparative examples 12 and 13, respectively.

Processes used in comparative example 12 and example 15 comprise dry blending polyamide, glass fiber and interfacial modifier, and feeding via first feeding entry of extruder; while processes used in comparative example 13 and example 16 comprise premixing polyamide with interfacial modifier, feeding via first feeding entry of the extruder, melting the polyamide, then, feeding glass fiber via second feeding entry to compound the mix. The strengths were tested as described above and the results obtained were listed in Table 6 also. It can be seen that the interfacial modifier is always effective in spite of the different feeding methods.

Comparative Example 14 and Example 17

Table 7 lists formulations of composites of comparative example 14 and example 17, wherein effect of interfacial modifier under the existence of processing aid, heat stabilizer, antioxidant and other additives on the strength of the composites was evaluated. Process used herein comprises premixing interfacial modifier with polyamide, feeding the additives stated above together and compounding in an extruder. Strengths were tested as described above and results obtained were listed in Table 7 also.

Comparative Example 15 and Example 18

Table 8 lists formulations of composites of comparative example 15 and example 18, wherein effects of interfacial modifier on talc-reinforced polyamide were evaluated. Process used herein comprises premixing interfacial modifier with polyamide and talc, and feeding into extruder to compound the mix. Strengths were tested as described above and results obtained were listed in Table 8 also. It is apparent that not only the flexural strength of the composite was enhanced, but also the heat distortion temperature was raised after the interfacial modifier was added into the composite.

It is obvious, from the comparative examples and examples, that glass fibers from different suppliers, talc, or different surface treatment on glass fiber, or different feeding manner of glass fiber during compounding, can have somewhat various influence on the physical properties of the reinforced polyamide composites; nevertheless, the interfacial modifiers and the manufacturing process of the instant invention have positively improving effect on the physical properties of the resulted reinforced polyamide composites.

TABLE 1

| Composition and Characteristics | Comparative Example | | | Example | | |
|---|---|---|---|---|---|---|
| | 1 | 2 | 3 | 1 | 2 | 3 |
| Polyamide-6 | 100 | 100 | 100 | 100 | 100 | 100 |
| Glass fiber | NitoBo CS-3J-454S | America-PPG -387 | America-PPG -3540 | NitoBo CS-3J-454S | America-PPG -387 | America-PPG -3540 |
| Content of glass fiber (wt %) | 43 | 43 | 43 | 43 | 43 | 43 |
| Interfacial Modifier-(I) | | | | | | |
| $R_1(CO_2H)x$ $R_1$ = aliphatic and/or aromatic group | — | — | — | 0.5 | 0.5 | 0.5 |

TABLE 1-continued

| Composition and | Comparative Example | | | Example | | |
|---|---|---|---|---|---|---|
| Characteristics | 1 | 2 | 3 | 1 | 2 | 3 |
| $x = 2$ | | | | | | |
| No. of Carbons in $R_1$ = 2-12 | | | | | | |
| Flexural Strength (kg/cm$^2$) | 1000 | 1220 | 1530 | 1670 | 1690 | 1830 |

TABLE 2

| Composition and | Comparative Example | | | Example | | |
|---|---|---|---|---|---|---|
| Characteristics | 4 | 5 | 6 | 4 | 5 | 6 |
| Polyamide-6/6 | 100 | 100 | 100 | 100 | 100 | 100 |
| Glass fiber (makers and grades) | NitoBo CS-3J-454S | America-PPG -3541 | Dai-Lai -G-6 | NitoBo CS-3J-454S | America-PPG -3541 | Dai-Lai -G-6 |
| Content of glass fiber (wt %) | 43 | 43 | 43 | 43 | 43 | 43 |
| Interfacial Modifier-(I) | | | | | | |
| $R_1(CO_2H)x$ | — | — | — | 0.5 | 0.5 | 0.5 |
| $R_1$ = aliphatic and/or aromatic group | | | | | | |
| $x = 2$ | | | | | | |
| No. of Carbons in $R_1$ = 2-12 | | | | | | |
| Flexural Strength (kg/cm$^2$) | 1360 | 1730 | 1240 | 1520 | 1940 | 1420 |

TABLE 3

| Composition and | Comparative Example | Example | | |
|---|---|---|---|---|
| Characteristics | 7 | 7 | 8 | 9 |
| Polyamide-6 | 100 | 100 | 100 | 100 |
| Glass fiber (makers and grades) | NitoBo CS-3J-454S | NitoBo CS-3J-454S | NitoBo CS-3J-454S | NitoBo CS-3J-454S |
| Content of glass fiber (wt %) | 43 | 43 | 43 | 43 |
| Interfacial Modifier-(I) | | | | |
| $R_1(CO_2H)x$ | — | 0.5 | — | — |
| $R_1$ = aliphatic and/or aromatic group | | | | |
| $x = 2$ | | | | |
| Interfacial Modifier-(II) | | | | |
| $R_2(CO)_2NH$ | — | — | 0.5 | — |
| $R_2$ = aliphatic and/or aromatic group | | | | |
| No. of carbons in $R_2$ = 4-8 | | | | |
| Interfacial Modifier-(III) | | | | |
| $R_3(CO)_2O$ | — | — | — | 0.5 |
| $R_3$ = aliphatic and/or aromatic group | | | | |
| No. of carbons in $R_3$ = 2-6 | | | | |
| Flexural Strength (kg/cm$^2$) | 1000 | 1670 | 1530 | 1530 |

| Composition and | Comparative Example | | Example | | |
|---|---|---|---|---|---|
| Characteristics | 8 | 9 | 10 | 11 | 12 |
| Polyamide-6 | 100 | 100 | 100 | 100 | 100 |
| Glass fiber (makers and grades) | NitoBo CS-3J-454S | America-PPG -3541 | NitoBo CS-3J-454S | America-PPG -3541 | America-PPG -3541 |
| Content of glass fiber (wt %) | 43 | 43 | 43 | 43 | 43 |
| Interfacial Modifier-(I) | | | | | |
| $R_1(CO_2H)x$ | — | — | 0.5 | 3 | — |
| $R_1$ = aliphatic and/or aromatic group | | | | | |
| $x = 2$ | | | | | |
| No. of carbons in $R_1$ = 2-12 | | | | | |
| Interfacial Modifier-(III) | | | | | |
| $R_3(CO)_2O$ | — | — | — | — | 1 |
| $R_3$ = aliphatic and/or aromatic group | | | | | |
| No. of Carbons in $R_3$ = 2-6 | | | | | |
| Flexural Strength (kg/cm$^2$) | 1460 | 2560 | 2420 | 2710 | 2700 |

TABLE 4

| Composition and | Comparative Example | | Example | | |
|---|---|---|---|---|---|
| Characteristics | 8 | 9 | 10 | 11 | 12 |
| Polyamide-6 | 100 | 100 | 100 | 100 | 100 |

TABLE 4-continued

| Composition and Characteristics | Comparative Example 8 | Comparative Example 9 | Example 10 | Example 11 | Example 12 |
|---|---|---|---|---|---|
| Glass fiber (makers and grades) | NitoBo CS-3J-454S | America-PPG -3541 | NitoBo CS-3J-454S | America-PPG -3541 | America-PPG -3541 |
| Content of glass fiber (wt %) | 43 | 43 | 43 | 43 | 43 |
| Interfacial Modifier-(I) | | | | | |
| $R_1(CO_2H)x$ $R_1$ = aliphatic and/or aromatic group $x = 2$ No. of carbons in $R_1$ = 2-12 | — | — | 0.5 | 3 | — |
| Interfacial Modifier-(III) | | | | | |
| $R_3(CO)_2O$ $R_3$ = aliphatic and/or aromatic group No. of carbons in $R_3$ = 2-6 | — | — | — | — | 1 |
| Flexural Strength (kg/cm$^2$) | 1460 | 2560 | 2420 | 2710 | 2700 |

TABLE 5

| Composition and Characteristics | Comparative Example 10 | Comparative Example 11 | Example 13 | Example 14 |
|---|---|---|---|---|
| Polyamide-6 | 100 | 100 | 100 | 100 |
| Glass fiber (makers and grades) | NitoBo CS-3J-454S | NitoBo CS-3J-454S | NitoBo CS-3J-454S | NitoBo CS-3J-454S |
| Content of glass fiber (wt %) | 15 | 43 | 15 | 43 |
| Interfacial Modifier-(I) | | | | |
| $R_1(CO_2H)x$ $R_1$ = aliphatic and/or aromatic group $x = 2$ No. of carbons in $R_1$ = 2-12 | — | — | 0.5 | 0.5 |
| Flexural Strength (kg/cm$^2$) | 900 | 1000 | 1170 | 1670 |

TABLE 6

| Composition and Characteristics | Comparative Example 12 | Comparative Example 13 | Example 15 | Example 16 |
|---|---|---|---|---|
| Polyamide-6 | 100 | 100 | 100 | 100 |
| Glass fiber (makers and grades) | America-PPG -3540 | America-PPG -3541 | America-PPG -3540 | America-PPG -3541 |
| Content of glass fiber (wt %) | 43 | 43 | 43 | 43 |
| Interfacial Modifier-(I) | | | | |
| $R_1(CO_2H)x$ $R_1$ = aliphatic and/or aromatic group $x = 2$ No. of carbons in $R_1$ = 2-12 | — | — | 0.5 | 0.5 |
| Flexural Strength (kg/cm$^2$) | 1530 | 2560 | 1830 | 2700 |
| Remarks | One Stage Feeding | Two Stages Feeding | One Stage Feeding | Two Stages Feeding |

TABLE 7

| Composition and Characteristics | Comparative Example 14 | Example 17 |
|---|---|---|
| Polyamide-6 | 100 | 100 |
| Glass fiber (makers and grades) | NitoBo CS-3J-454S | NitoBo CS-3J-454S |
| Content of glass fiber (wt %) | 43 | 43 |
| Processing Aid | 0.5 | 0.5 |
| Heat Stabilizer | 0.3 | 0.3 |
| Antioxidant | 0.3 | 0.3 |
| Interfacial Modifier-(I) | | |
| $R_1(CO_2H)x$ $R_1$ = aliphatic and/or aromatic group $x = 2$ No. of carbons in $R_1$ = 2-12 | — | 0.5 |
| Flexural Strength (kg/cm$^2$) | 1000 | 1660 |

TABLE 8

| Composition and Characteristics | Comparative Example 15 | Example 18 |
|---|---|---|
| Polyamide-6 | 80 | 80 |
| Talc | 20 | 20 |
| Interfacial Modifier-(IV) | | |
| $R_3(CO)_2O$ $R_3$ = aliphatic and/or aromatic group No. of carbons in $R_3$ = 2-6 | — | 0.5 |

TABLE 8-continued

| Composition and Characteristics | Comparative Example 15 | Example 18 |
|---|---|---|
| H.D.T.[1] (264 psi) °C. | 134 | 158 |
| Flexural Strength (kg/cm$^2$) | 1330 | 1370 |

[1]Heat Distortion Temperature

We claim:

1. A reinforced polyamide composite consisting of:
   (A) polyamide resin,
   (B) 1 to 100 phr of at least one of fiber and filler reinforcing agent,
   (C) 0.1 to 5 phr of an interfacial modifier, based on the polyamide, wherein the interfacing modifier is selected from the group consisting of $C_2H_2(CO_2H)_2$, $C_6H_6(CO)_2NH$, and $C_2H_2(CO)_2O$, and
   (D) at least one processing aid, heat stabilizer, or antioxidant.

2. A composite according to claim 1, wherein the polyamide is nylon-6 or nylon 6/6.

3. A composite according to claim 1, wherein the reinforcing agent is talc.

4. A composite according to claim 3, wherein the amount of talc in the composite is in the range of 1 to 100 phr based on the polyamide.

5. A composite according to claim 4, wherein the amount of talc in the composite is in the range of 10 to 90 phr based on the polyamide.

6. A composite according to claim 1, wherein the reinforcing agent is glass fiber.

7. A composite according to claim 1, wherein the surface of the reinforcing agent is further treated with a coupling agent, said coupling agent containing amino functional groups, epoxy functional groups, or a combination of amino and epoxy functional groups; the amount of said reinforcing agent in said composite is in the range of 1 to 100 phr based on the polyamide.

8. A composite according to claim 7, wherein the amount of the reinforcing agent in the composite is in the range of 10 to 90 phr based on the polyamide.

* * * * *